T. T. FURLONG.
SPONGE-HOLDERS FOR HORSES' FEET.

No. 192,821.  Patented July 10, 1877.

Witnesses  Inventor

UNITED STATES PATENT OFFICE.

THOMAS T. FURLONG, OF CHICAGO, ILLINOIS, ASSIGNOR OF ONE-HALF HIS RIGHT TO ELLIOT B. DRAPER, OF SAME PLACE.

IMPROVEMENT IN SPONGE-HOLDERS FOR HORSES' FEET.

Specification forming part of Letters Patent No. 192,821, dated July 10, 1877; application filed June 11, 1877.

*To all whom it may concern:*

Be it known that I, THOMAS T. FURLONG, of Chicago, in the county of Cook and State of Illinois, have invented new and useful Improvements in Sponge-Holders or Foot-Coolers for Horses' Feet; and I do hereby declare the following to be a full, clear, and exact description thereof, reference being had to the accompanying drawings, forming part of this specification, in which—

Figure 1:
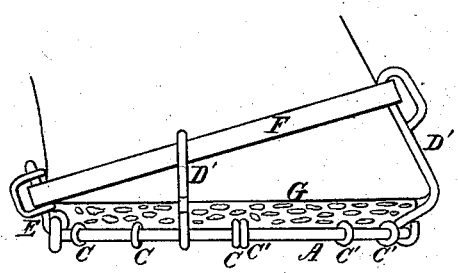
Figure 2:
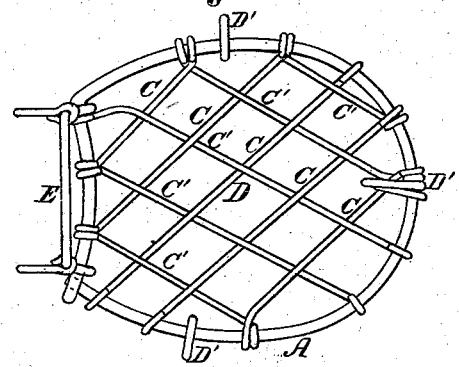
Figure 3:
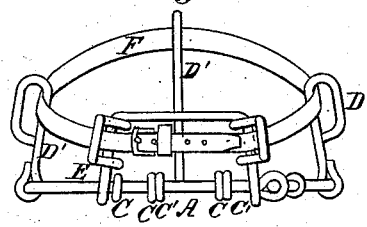

Figure 1 represents a side elevation of the foot-cooler embodying my improvements. Fig. 2 represents a general plan or top view of the same, with the strap for connecting the cooler to the hoof and the sponge removed, and Fig. 3 represents a perspective view of the same with the sponge removed.

Like letters of reference indicate like parts.

It is well known that when horses travel upon paved or hard dry streets, or stand during the day or night upon hard and dry floors, their hoofs become feverish, hard, and dry, and, consequently, tender. The object of my invention is to prevent such a condition of horses' feet, and to that end my invention consists in the construction and arrangement of the foot-cooler, so that it may be readily attached to or removed from the hoof, and hold in contact with the foot a moistened sponge or other porous material, as hereinafter more particularly described and claimed.

In the drawings, A represents a band, which is made of metal, preferably of wire, and bent to correspond with the shape of the lower surface of the hoof, as shown in Fig. 2. C and C' represent a series of wires, bent at their ends so as to clasp the band A, and are so arranged that the wires C will cross the wires C' and form a net-work, D. D' represents a series of wire loops, which are attached at their lower ends to the band A, and extend upward against the outer surface of the hoof, as shown in Fig. 1. E is a metal stirrup, which is hinged to the back of the band, and extends upward against the back of the hoof. F is a leather strap, which passes through the loops D' and stirrup E and around the hoof, by which means the several parts are attached to or held in place upon the hoof. G is a piece of ordinary sponge or other suitable porous material, which is of the proper size to cover the net-work, and is fitted between the net-work and the lower surface of the hoof, as shown in Fig. 1.

In using said sponge-holder or foot-cooler the sponge is first saturated with water or liniment, or other medicated liquid, as may be desired, and is then placed upon the net-work of the holder, and the latter secured to the hoof by the strap F, so as to cause the sponge to bear against the lower surface of the hoof, and is allowed so to remain during the night-time, or when the horse is standing upon the floor of the stable.

The contact of the moist sponge with the lower surface of the hoof keeps the hoof moist and cool, and, consequently, in a much more healthy condition.

Having thus described my invention, what I claim as new, and desire to secure by Letters Patent, is—

1. The band A, provided with the open net-work D, in combination with the loops D' and and strap F, substantially as and for the purpose specified.

2. The combination of the band A, net-work D, loops D', strap F, and stirrup E, substantially as and for the purpose specified.

THOMAS T. FURLONG.

Witnesses:
ELLIOT B. DRAPER,
N. C. GRIDLEY.